Patented June 25, 1946

2,402,672

UNITED STATES PATENT OFFICE 2,402,672

VACUUM DEHYDRATION OF BEETS

Robert M. Schaffner, Chicago, Ill., assignor to The Guardite Corporation, a corporation of Illinois No Drawing. Application May 31, 1944,
Serial No. 538,199

2 Claims. (Cl. 99—204)

This invention relates to the vacuum dehydration of beets.

The customary dehydration of beets results in the loss of the characteristic dark red color thereof. It has been found that the use of vacuum dehydration processes under proper conditions results in the retention of the color and flavor of the original beet even after cooking.

The beets are washed free of earth and may then be peeled by abrasion or chemical means or may be pressure cooked with the skin on and then peeled by machine or by hand. If the beets are first peeled they are then diced or sliced to a thickness of not more than ⅝ inch and loaded on screen-bottomed drying trays. Loadings of 1 lb. to 1.8 lbs. per square foot of screen area are employed. The beets are then transferred to a cooker which is evacuated to remove the air after which steam is introduced to bring the temperature of the beets from 200° to 250° F. It has been found that bringing the temperature rapidly in the chamber to 240° F. and maintaining it at that point for 20 minutes is satisfactory. The beets are then quickly cooled by evacuating the chamber.

If the beets have not been peeled they are loaded in any suitable manner within the cooker and cooked for 10 to 20 minutes at temperatures of approximately 240° F. The cooked beets are then cooled by evacuating the chamber or by cold running water. They are then peeled by hand or by machine and sliced or diced. They may then be loaded on drying trays at the previously indicated loading limits of 1 lb. to 1.8 lbs. per square foot. The beets are then given a second cooking after the chamber has been evacuated to remove the air. This may be at a temperature of 200–250° F., but, in view of the previous cooking, the time required is not great. For example, a satisfactory product was produced by cooking for 10 minutes at 206° F. It is desired to cook the product to a point where it is just short of losing its texture and becoming mushy, because even though this results in a wetter initial product, the final product has a lower moisture content, as described in my co-pending application, Serial No. 538,091, filed May 30, 1944. After cooking, the beets are cooled by evacuating the chamber to about ½ inch absolute to produce a temperature not above 60° F.

The beets produced by either of the foregoing processes are then ready for drying. They are preferably passed to a dryer without contact with air and are dried therein at a low pressure, preferably below 100 mm. of mercury.

The preferred dryer is described in Heineman application, Serial No. 520,773, filed February 2, 1944, and Baer application, Serial No. 524,177, filed February 28, 1944. In this type of dryer the pressure is maintained constant throughout an elongated drying zone, down which the material to be dried passes. The material is maintained in trays which are surrounded at all times by heating coils which are heated by internal steam. Superheated steam is also introduced to the apparatus at the beginning and end thereof and withdrawn centrally of the device. The average distance from the coils to the material to be dried is about 3 inches. The normal pressure is approximately 57 mm.

Under these conditions, the radiant heat surfaces were maintained at the varying temperatures for the following successive times:

| Radiant surface temperature | Minutes of exposure |
| --- | --- |
| 259° F | 40 |
| 240° F | 40 |
| 228° F | 130 |
| 219° F | 90 |

The product so treated was an open market beet of the Detroit Dark Red type, processed approximately 118 hours after harvest. The material had a moisture content of 89% after blanching, and a final moisture content of 3.9% after drying. The color was good, and the flavor of the product after rehydration was good, as was its texture. The dehydration ratio, which is the original weight divided by the dehydrated weight, was 8.76. The rehydration ratio, which is the weight of the dried product after 30 minutes of boiling in water divided by the dehydrated weight, was 5.73. The reconstitution percentage, which is the rehydration ratio divided by the dehydration ratio, was, therefore, 65.4. The product was originally washed, peeled, diced to ⅜ inch, and blanched for 20 minutes at 240° F. It was loaded on trays at 1.40 lbs. per square inch, and again blanched at 202° F. for 10 minutes.

The following table shows other results:

| Variety | Open market believed to be Detroit Dark Red | Harris Perfected Detroit | Asgrow Canner | Burpee Extra Early | Harris Early Wonder | Burpee Black Red Ball | Burpee Black Red Ball | |
|---|---|---|---|---|---|---|---|---|
| Processed, hrs. after harvest | [1] 46 | 113 | 121 | 137 | 234 | 234 | 243 | |
| Original moisture, percent (after retort blanch) | 88.6 | 86.5 | 86.7 | 84.7 | 86.7 | 89.6 | 89.6 | 89.6 |
| Final moisture, percent | 5.5 | 3.7 | 3.5 | 2.9 | 2.7 | 3.9 | 3.1 | 4.2 |
| Flavor of rehyd. product | Good | Good | Good | Good | Good | Good | Good | Good |
| Texture of rehyd. product | Good | Good | Good | Good | Good | Good | Good | Good |
| Dehyd. ratio (orig. wt./dehyd. wt.) | 8.26 | 8.00 | 7.58 | 7.20 | 7.20 | 8.00 | 8.51 | 9.45 |
| Rehyd. ratio—30 min. boil (rehyd. wt./dehyd. wt.) | 5.24 | 4.47 | 4.53 | 4.32 | 4.59 | 4.46 | 4.36 | 3.86 |
| Reconstitution, percent (rehyd. r/dehyd. r.) | 63.3 | 56.0 | 59.8 | 60.0 | 63.7 | 55.7 | 51.2 | 41.0 |
| Pretreat retort (also wash, peeled, ⅝″ dice): Min. / Temp. | 20 / 240 | 20 / 240 | 20 / 240 | 20 / 240 | | 20 / 240 | 20 / 240 | |
| Loading, lbs./sq. ft. | 1.46 | 1.41 | 1.41 | 1.41 | 1.41 | 1.41 | ⅜ dice 1.41 | ⅛ slice 1.41 |
| Machine blanch: Min. / Temp. | 10 / 203 | 10 / 203 | 10 / 207 | 10 / 200 | 10 / 211 | | 10 / 206 | |
| Drying cycle: P—p.s.i. steam coil / M—minutes | P 20/10/5/2  M 40/40/190/30 = 300 | P 20/10/5/2  M 40/40/130/90 = 300 | P 20/10/5/2  M 40/40/130/90 = 300 | P 20/10/5/2  M 40/40/130/90 = 300 | P 20/10/5/2  M 40/40/130/90 = 300 | | P 20/10/5/2  M 40/40/130/90 = 300 | |
| Finishing temp., °F | 171–177 | 183–189 | 180–196 | 164–167 | 205 | 203 | 179 | 179 |

[1] Hrs. after purchase.

The foregoing detailed description has been given for clearness of understanding only, and no unnecessary limitations should be understood therefrom.

What I claim as new, and desire to secure by Letters Patent, is:

1. The method of processing beets which comprises loading whole beets into a cooker and cooking them for from ten to twenty minutes at approximately 240° F., cooling the beets, peeling them, cutting the beets into particles not over ⅝ inch thick, loading them into screen-bottomed trays at 1 to 1.8 pound per square foot of tray surface, again cooking the beets at a temperature of 200–250° F. in the absence of air for approximately ten minutes, cooling the beets by evacuating the chamber, transferring them to a dryer without contact with air, and drying under reduced pressure in an atmosphere of superheated steam while subjecting the beets to intense radiant energy to produce a final moisture content below 7%.

2. The method as set forth in claim 1 wherein the source of radiant energy is maintained at a temperature of 200°–298° F. for a distance of the order of 3 inches, and the temperature of the radiant energy source is reduced as the beets dry.

ROBERT M. SCHAFFNER.